United States Patent
Amada et al.

(10) Patent No.: US 6,339,676 B1
(45) Date of Patent: *Jan. 15, 2002

(54) VIDEO SIGNAL RECORDING AND REPRODUCING APPARATUS COMPATIBLE WITH ANALOG AND DIGITAL VIDEO SIGNAL RECORDING AND REPRODUCING

(75) Inventors: Nobutaka Amada; Hitoaki Owashi; Takaharu Noguchi, all of Yokohama; Noriyuki Kumasaka, Ome; Hideo Zama, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,911

(22) Filed: Apr. 19, 2000

Related U.S. Application Data

(63) Continuation of application No. 08/568,470, filed on Dec. 7, 1995, now Pat. No. 6,104,862.

(30) Foreign Application Priority Data

Dec. 19, 1994 (JP) .............................. 6-314450
Dec. 21, 1994 (JP) .............................. 6-317947

(51) Int. Cl.[7] .............................................. H04N 5/782
(52) U.S. Cl. ...................... 386/108; 386/35; 386/111; 386/124
(58) Field of Search ................. 386/103, 108, 386/35, 95, 67, 23, 92, 46, 109, 111, 112, 3, 90, 101, 123, 124; 360/21, 18, 32, 27, 76, 119, 121, 122, 110; H04N 5/92, 5/782

(56) References Cited

U.S. PATENT DOCUMENTS

| | | | | |
|---|---|---|---|---|
| 4,608,611 A | * | 8/1986 | Ota .............................. | 386/26 |
| 4,743,977 A | * | 5/1988 | Yoshioka et al. ............. | 386/35 |
| 4,743,978 A | | 5/1988 | Tanaka | |
| 4,888,658 A | * | 12/1989 | Ono et al. ................... | 360/126 |
| 5,335,125 A | | 8/1994 | Nakatsu et al. ............. | 360/10.3 |
| 5,359,471 A | | 10/1994 | Hasegawa | |
| 5,519,544 A | * | 5/1996 | Hara ............................ | 360/22 |
| 5,548,410 A | * | 8/1996 | Kim et al. .................... | 360/32 |
| 5,706,385 A | * | 1/1998 | Suzuki et al. ................. | 386/34 |
| 5,862,004 A | * | 1/1999 | Arai et al. ................... | 386/109 |
| 5,903,704 A | * | 5/1999 | Owashi et al. ............... | 386/95 |
| 6,104,862 A | * | 8/2000 | Amada et al. ............... | 386/103 |

FOREIGN PATENT DOCUMENTS

| | | | |
|---|---|---|---|
| EP | 0 227 210 | 7/1987 | |
| EP | 0 593 307 | 4/1994 | |
| EP | 0 601 963 | 6/1994 | |
| EP | 0 606 180 | 7/1994 | |
| JP | 62-208770 | 9/1987 | |
| JP | 62272695 | * 11/1987 | ............ H04N/9/80 |
| JP | 5-122653 | 5/1993 | |
| JP | 5-207507 | 8/1993 | |
| JP | 6-231402 | 8/1994 | |
| WO | WO 96/06426 | 2/1996 | |
| WO | WO 96/13832 | 5/1996 | |

OTHER PUBLICATIONS

*The Journal of the Institute of Television Engineers of Japan*, vol. 47, No. 4 (1983), pp. 486–503.

* cited by examiner

Primary Examiner—Thai Tran
(74) Attorney, Agent, or Firm—Crowell & Moring LLP

(57) ABSTRACT

An apparatus for recording and reproducing a digital video signal on and from a common recording medium by using the head configuration common to the conventional one while maintaining exchangeability with the current analog VTR. An analog video and audio signals are recorded and reproduced on and from an video track and an underlying deep-layer track, respectively, by means of magnetic heads and magnetic heads. On the other hand, a digital video and audio signal is recorded and reproduced on and from two adjacent tracks by means of the magnetic heads for analog audio recording. During reproduction, an identification signal generating circuit generates an identification signal for discriminating a recorded signal, and a control signal is PWM modulated with the identification signal and recorded on a control track by means of a magnetic head.

9 Claims, 12 Drawing Sheets

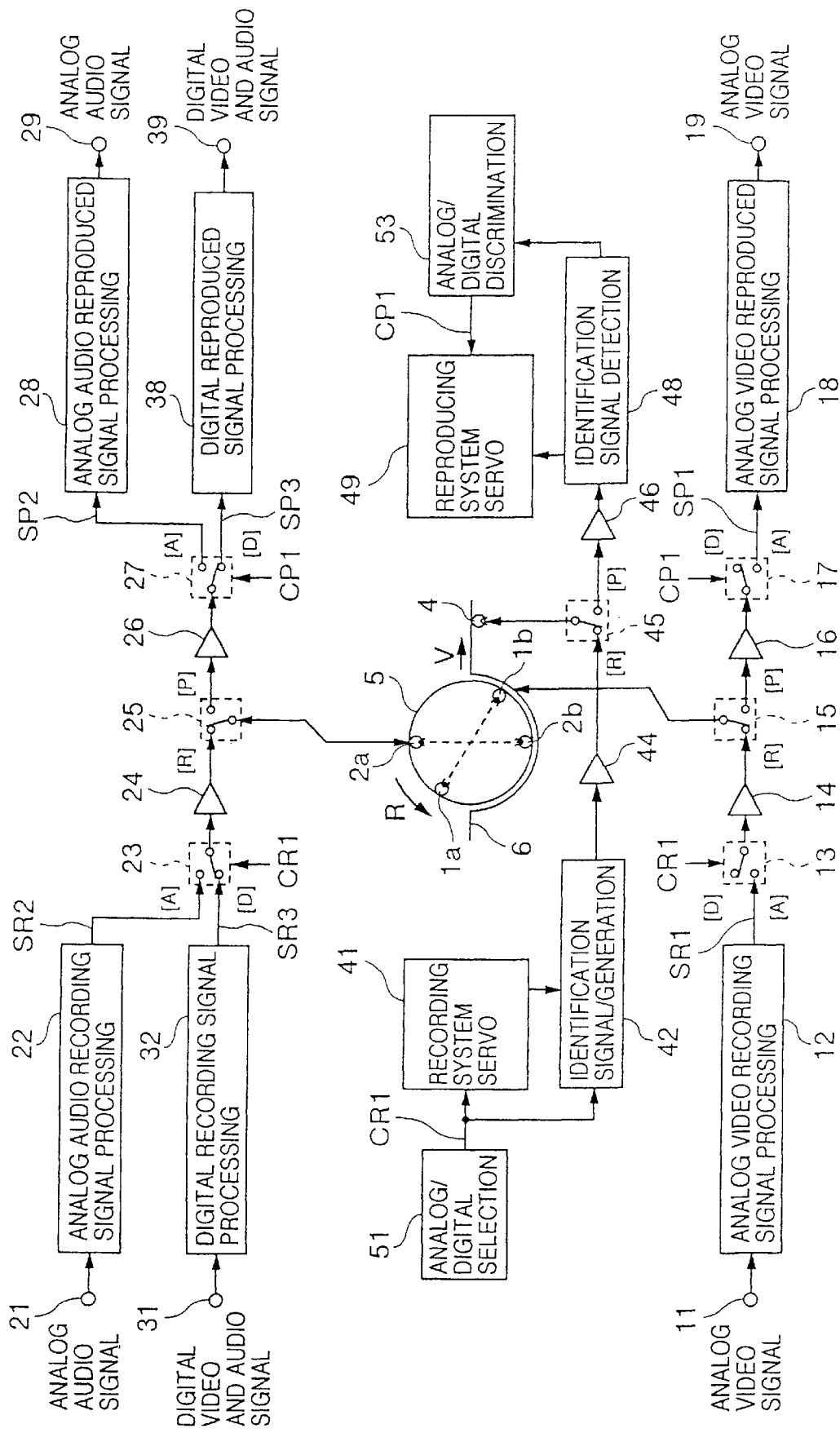

VIDEO SIGNAL RECORDING AND REPRODUCING APPARATUS COMPATIBLE WITH ANALOG AND DIGITAL VIDEO SIGNAL RECORDING AND REPRODUCING

This application is a continuation of application Ser. No. 08/568,470, filed Dec. 7, 1995, now U.S. Pat. No. 6,104,862.

BACKGROUND OF THE INVENTION

The present invention relates to a magnetic recording and reproducing apparatus for digital video signals and more particularly to a video signal recording and reproducing apparatus having exchangeability with the existing analog VTR.

Currently, an analog type VTR using an oxide tape of ½-inch width has been practiced as a domestic video signal recording and reproducing apparatus.

On the other hand, practicing of digital broadcasting expected to be next-generation TV broadcasting has been promoted. For example, in the United States, an ATV (Advanced Television) scheme is known in which a wide-band video signal having higher resolution than a video signal (hereinafter referred to as an SD (Standard Definition) signal) in the existing NTSC scheme or PAL scheme is subjected to high-efficiency digital compression coding and is broadcast at a bandwidth of 6 MHz which is the same as that in the existing TV broadcasting. Also, a system has been known in which the SD video signal is subjected to high-efficient digital compression coding by using an MPEG (Moving Picture Experts Group) system and is broadcast through a satellite or a coaxial cable.

The digital broadcasting systems as above are detailed in The Journal of the Institute of Television Engineers of Japan, Vol.47, No.4(1993), pp.486–503.

SUMMARY OF THE INVENTION

Conceivably, the digital TV broadcasting will be put into practice in the near future and will be practiced in a coexistent form with the analog TV broadcasting but the conventional analog VTR has failed to record and reproduce a digital video signal while keeping the digital signal intact.

An object of the present invention is to provide a video signal recording apparatus and a video signal recording and reproducing apparatus which have exchangeability with the existing analog VTR and which can record and reproduce a video and audio signal used in, for example, the digital TV broadcasting and subject to digital compression coding while keeping the digital signal intact.

To accomplish the above object, according to the present invention, in a video signal recording and reproducing apparatus having a first magnetic head group for recording and reproducing an analog video signal on and from a video track, a second magnetic head group for recording and reproducing an analog audio signal on and from a depth layer underlying the video track, and a servo circuit for controlling the rotation of a drum and the travel of a tape, there are provided digital recording signal processing means for performing formatting and channel coding (modulation) of a digital video signal, analog/digital selecting means for selecting an analog video signal or a digital video signal for a signal to be recorded, analog/digital discriminating means for determining the recorded signal as to whether to be an analog video signal or a digital video signal, and digital signal processing means for demodulating a reproduced digital video signal and performing the de-formatting processing such as error correction, whereby metal heads of a narrow gap are used for the second magnetic head group and recording and reproduction of the digital video signal is effected by means of the second magnetic head group.

In the video signal recording and reproducing apparatus according to the present invention, there are further provided a third magnetic head group being dedicated to recording and reproduction of a digital video signal at a transmission bit rate of the digital video signal, and means for recording and reproducing an identification signal for discriminating between analog and digital.

In the case of analog recording, an audio signal is recorded by means of the second magnetic head group. At that time, since metal heads are used for the second magnetic head group, recording reaching a depth of a magnetic layer even in the presence of the narrow gap can be permitted and the sufficient reproducing performance can be ensured even when overwrite recording of an analog video signal is effected on a surface layer.

On the other hand, a digital video signal is added with, for example, an error correction code, formulated into blocks and subjected to channel coding (modulation) by means of the digital recording signal processing means and recorded, by means of the second magnetic head group or the second and third magnetic head groups, on a helical track formed in an oblique direction of the magnetic tape. At that time, through the processing on time domain in the digital recording signal processing means, the input digital video signal can be recorded at a substantially constant recording bit rate regardless of a transmission bit rate of the input digital video signal. The servo circuit causes the rotary drum to rotate at a substantially constant rotation speed corresponding to the recording bit rate and controls the transportation speed of the magnetic tape by switching it in accordance with the transmission bit rate of the inputted digital video signal. An identification signal indicating that the recorded signal is the digital video signal is recorded on a so-called linear track in the longitudinal direction of the magnetic tape.

During reproduction, the analog/digital discriminating means detects the identification signal recorded on the linear track and determines the recorded signal as to whether to be an analog video signal or a digital video signal. Then, the reproduced digital video signal is subjected to the processing such as demodulation and error correction by means of the digital reproduced signal processing means, so that the original digital video signal is restored. At that time, since the heads of a narrow gap are used for the second magnetic head group, short-wavelength recording complying with the gap length can be permitted and as a result, recording and reproduction of digital video of high picture quality can be realized.

BRIEF DESCRIPTION OF THE DRAWINGS

FIG. 1 is a block diagram showing an embodiment of a video signal recording and reproducing apparatus according to the present invention.

DESCRIPTION OF THE PREFERRED EMBODIMENTS

Figure 2A:
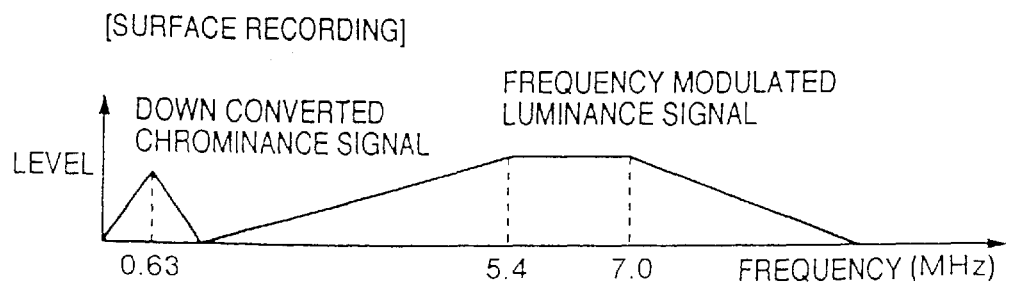
FIGS. 2A–2B are a diagram showing examples of a recording frequency spectrum of an analog video signal and that of an analog audio signal.

The present invention will now be described by way of example with reference to the accompanying drawings.

FIG. 1 is a block diagram showing an embodiment of a video signal recording and reproducing apparatus according to the present invention. In the Figure, reference numerals 1a, 1b, 2a, 2b and 4 designate magnetic heads, 5 a rotary drum, 6 a magnetic tape, 11, 21 and 31 input terminals, 12 an analog video recording signal processing circuit, 22 an analog audio recording signal processing circuit, 32 a digital recording signal processing circuit, 13, 15, 17, 23, 25, 27 and 45 transfer switches, 14, 24 and 44 recording amplifiers, 16, 26 and 46 reproducing amplifiers, 18 an analog video reproduced signal processing circuit, 28 an analog audio reproduced signal processing circuit, 38 a digital reproduced signal processing circuit, 19, 29 and 39 output terminals, 41 a recording servo circuit, 42 an identification signal generating circuit, 48 an identification signal detecting circuit, 49 a reproducing system servo circuit, 51 an analog/digital selecting circuit, and 53 an analog/digital discriminating circuit.

The mode of recording an analog video signal will first be described. It is to be noted that during recording, the transfer switches 15, 25 and 45 are each transferred to an "R" contact.

Figure 2B:
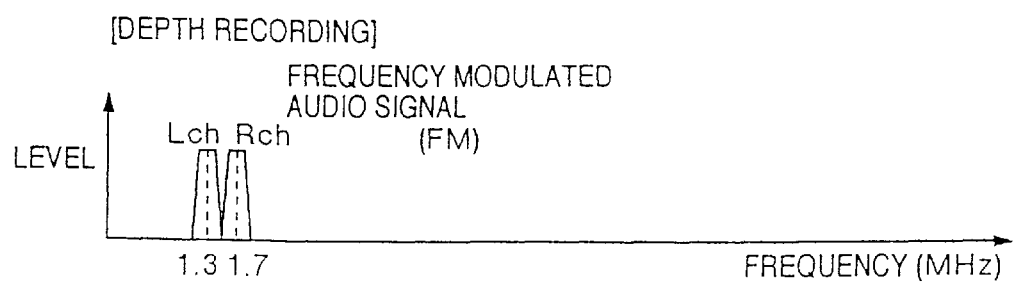

In the figure, a luminance signal component and a chrominance signal component of an analog video signal fed from the input terminal 11 undergo FM modulation and down conversion, respectively, by means of the analog video recording signal processing circuit 12, and resulting signals are added together so as to be converted into an analog video recording signal SR1. On the other hand, audio signal components of left/right or main/sub two channels of an analog audio signal fed from the input terminal 21 are each subjected to FM modulation by means of the analog audio recording signal processing circuit 22, and resulting signals are added together so as to be converted into an analog audio recording signal SR2. FIG. 2 illustrates examples of bands of the analog video recording signal SR1 and the analog audio recording signal SR2 at sections (A) and (B), respectively.

When the analog video signal is now selected, by the analog/digital selecting circuit 51, as a signal to be recorded, a control signal CR1 delivered out of this selecting circuit causes each of the transfer switches 13 and 23 to transfer to an "A" contact, so that the analog video recording signal SR1 and the analog audio recording signal SR2 are supplied to the magnetic heads 1a, 1b and the magnetic heads 2a, 2b, through the recording amplifiers 14 and 24, respectively. The recording system servo circuit 41 controls rotation speed R of the rotary drum 5 to a first rotation speed R1 and transportation speed V of the magnetic tape 6 to a first travel speed V1. It is to be noted that the drum rotation speed R1 is set to the same value as that of a frame frequency of the analog video signal to be recorded.

Figure 3:
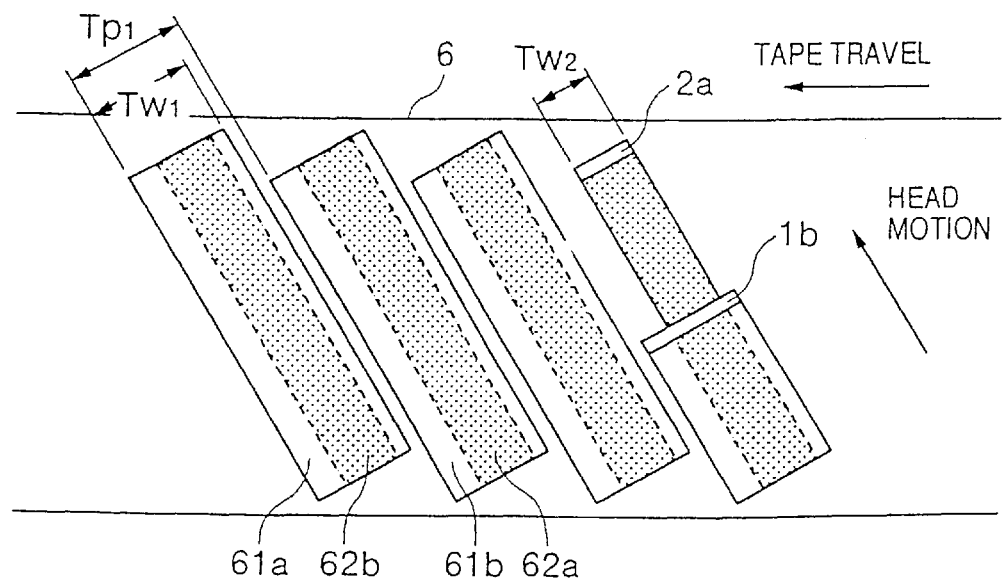
FIG. 3 is a diagram showing a track pattern on a magnetic tape during recording of an analog video signal and an analog audio signal.

FIG. 3 illustrates an example of a recording pattern at that time. The analog audio recording signal SR2 is first recorded on the magnetic tape 6 by means of the magnetic heads 2a and 2b to form analog audio tracks 62a and 62b having a track width Tw2. Subsequently, the analog video recording signal SR1 is recorded by means of the magnetic heads 1a and 1b while being superposed on the analog audio tracks 62a and 62b to form analog video tracks 61b and 61a having a track width Tw1. Denoted by Tp1 is a track pitch. For example, when the drum diameter of the rotary drum 5 is set to 62 mm, the rotation speed R1 thereof is set to 30 rps which equals the frame frequency of the analog video signal and the transportation speed V1 of the magnetic tape 6 is set to 33.35 mm/s, the track pitch Tp1 is 58 $\mu$m. In this case, the track width Tw1 of the analog video tracks 61b and 61b is set to 40 to 58 $\mu$m and the track width Tw2 of the analog audio tracks 62a and 62b is set to be equal to or greater than 20 $\mu$m. When the analog video signal has a frame frequency of 25 Hz, the drum rotation speed R1 is 25 rps and for the tape transportation speed V1 being 23.39 mm/s, the track pitch Tp1 is 49 $\mu$m.

Next, the mode of recording a digital video signal will be described.

Turning to FIG. 1, when a digital video and audio signal subject to high-efficiency compression coding pursuant to, for example, the MPEG scheme is applied to the input terminal 31, it is subjected to the formatting processing, including interleave, addition of an error correction code and a synchronizing signal and block formulation, by means of the digital recording signal processing circuit 32 and is also subjected to channel coding (modulation) so as to be converted into a digital recording signal SR3.

Here, if the same oxide tape as that for analog recording is used as the magnetic tape 6, the recording bit rate of the digital recording signal SR3 can be increased to about 20 Mbps when the oxide tape is increased in coercive to exhibit high performance. In this case, the transmission bit rate of the input signal being up to about 15 Mbps can be maintained even when the redundancy due to the formatting processing in the digital recording signal processing circuit 32. On the other hand, the transmission rate of an SD video and audio signal subject to high-efficiency compression coding pursuant to the MPEG-2 scheme is about 10 Mbps maximally and accordingly, this digital SDTV signal can be recorded on the same oxide tape as that for analog recording. Thus, the present invention is achieved in the light of the fact that by virtue of advanced high-efficiency video compression techniques, the digital video signal has been allowed to be recorded in a bandwidth near the analog video signal.

Incidentally, as will be seen from the above example, the approximately 15 Mbps maximum input bit rate has a margin of about 5 Mbps in comparison with the approximately 10 Mbps actual input bit rate and therefore, this margin for data may be used for recording of a signal for the purpose of trick playing back.

Now, when the digital video signal is selected, by means of the analog/digital selecting circuit 51, as a signal to be recorded, a control signal CR1 delivered out of this selecting circuit causes the transfer switch 23 to transfer to a "D" contact, so that the digital recording signal SR3 is supplied to the magnetic heads 2a and 2b through the recording amplifier 24. At that time, the control signal CR1 also causes the transfer switch 13 to transfer to a "D" contact and the magnetic heads 1a and 1b are not supplied with any signal. The recording system servo circuit 41 receives the control signal CR1 from the analog/digital selecting circuit 51 to control rotation speed R of the rotary drum 5 to a second rotation speed R2 and transportation speed V of the magnetic tape 6 to a second transportation speed V2. It is to be noted that the drum rotation speed R2 is set to a constant rotation speed regardless of the frame frequency of the digital video signal to be recorded.

Further, the recording bit rate of the digital recording signal SR3 has no relation to the transmission bit rate of the inputted digital video and audio signal and the digital recording signal is recorded at a substantially constant recording bit rate which is determined from the density of recording on the magnetic tape 6. A maximum input bit rate is then determined from the recording bit rate and in the case of the input bit rate being less than the above, dummy data is added or data for the purpose of trick playing back as described previously is added to perform recording while keeping the recording bit rate substantially constant. For example, when the magnetic tape 6 is a high-performance oxide tape, the recording bit rate is about 20 Mbps and the maximum input bit rate is about 15 Mbps as described above, making it possible to record a digital video and audio signal of a maximum of 15 Mbps.

Incidentally, in recording of the digital signal as above, the material and the gap length of the magnetic heads 2a and 2b are of a matter. In the conventional apparatus dedicated to analog recording, the recording frequency of an audio signal is low as shown at (B) in FIG. 2, the gap length of the magnetic heads 2a and 2b is considerably larger as compared to that of the magnetic heads 1a and 1b for video signal recording, amounting up to 1 $\mu$m or more, to meet recording reaching a depth of a magnetic layer, and the material is in general ferrite. However, as taught from the principle of magnetic recording, signals cannot be recorded and reproduced at a frequency at which the gap length of the magnetic head coincides with the recording wavelength and accordingly, with the conventional head dedicated to analog audio recording, the digital signal of high bit rate as described previously cannot be recorded and reproduced. Under the circumstances, according to the present invention, the gap length is set to be equal to or less than half the recording wavelength of the digital signal, specifically, equal to or less than 0.3 $\mu$m.

With the gap length of the magnetic head narrowed, the reluctance decreases to sharpen the shape of leakage magnetic field, thus permitting high-density recording but, on the other hand, the intensity of leakage magnetic field decreases to reduce the recording efficiency. Consequently, when the gap is made to be small in the conventional ferrite head, depth recording of analog voice cannot be effected. Therefore, according to the present invention, the head of metal substituting for the conventional material i.e., ferrite is employed to permit depth recording of analog voice even in the case of the small gap as above. The metal head can be constructed in various forms, including a head in which a metallic magnetic film is used at the gap portion of the conventional ferrite head and another head in which a metallic magnetic material is formed on a non-magnetic substrate. Used for the metallic magnetic film is, for example, Sendust, iron-tantalum-carbon, iron-tantalum-nitride or amorphous of cobalt system. The saturated magnetic flux density of the head using the ferrite material is typically about 0.5 teslas (T) at the most but when the metallic magnetic film is used, the saturated magnetic flux density increases, amounting up to 1 to 2 teslas (T). Accordingly, even with the head gap narrowed, a high magnetic field is allowed to reach a depth of the magnetic layer and depth recording of analog audio signals can be ensured. Further, by virtue of the narrow head gap, short-wavelength recording of digital signals can be realized with the magnetic head in common use.

Since the recording frequency differs for digital signals and analog audio signals and the analog audio signal must be recorded reaching a depth of the magnetic layer, an optimum recording current at which the highest S/N can be obtained is different for the two types of signals. Accordingly, though not illustrated, the recording amplifier 24 has the function to switch the recording current depending on the signal being either a digital signal or an analog audio signal.

Figure 4:
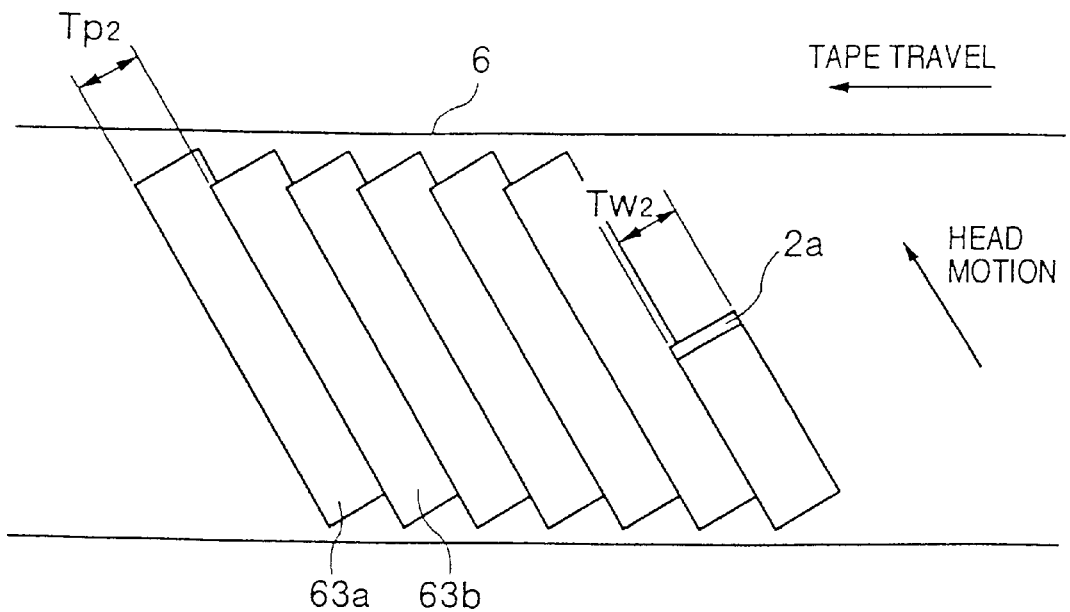
FIG. 4 is a diagram showing a track pattern on a magnetic tape during recording of a digital video and audio signal.

FIG. 4 shows an example of a recording pattern of the digital signal. The digital recording signal SR3 is recorded on the magnetic tape 6 by means of the magnetic heads 2a and 2b to form digital signal tracks 63a and 63b having a track pitch Tp2.

TABLE 1

| Item | Example 1 | Example 2 | Example 3 | Example 4 |
| --- | --- | --- | --- | --- |
| Track pitch | 29 $\mu$m | 19 $\mu$m | 24 $\mu$m | 23 $\mu$m |
| Drum rotation speed | 30 rps | 30 rps | 30 rps | 37.5 rps |
| Tape transportation speed | 16.7 mm/s | 11.1 mm/s | 13.9 mm/s | 16.7 mm/s |
| Head width | 32 $\mu$m | 28 $\mu$m | 28 $\mu$m | 28 $\mu$m |
| Recording time | 4 hours | 6 hours | 4.8 hours | 4 hours |

Table 1 shows examples of the relation of the track pitch Tp2 with respect to the drum rotation speed R2, tape transportation speed V2 and the head width Tw2 of the magnetic heads 2a and 2b. In all of the examples, the drum diameter is the same as that for analog recording, amounting to 62 mm.

In example 1 where the track pitch Tp2 is set to 29 μm, the drum rotation speed R2 is 30 rps equal to that for analog video recording of 30 frames and the tape transportation speed V2 is half the transportation speed for analog video recording of 30 frames. Incidentally, the head width of the existing head dedicated to analog audio recording is, in general, about 28 cm. This value is designed from the standpoint of realizing the standard play mode of 58 μm track pitch and the long play mode of 19 μm track pitch by using the common head. But with the head width set to 28 μm for the 29 μm track pitch, a gap takes place between tracks. Further, in consideration of a fitting error of the magnetic head 2b mounted to oppose the magnetic head 2a, the head width must be at least about 3 μm wider than the track pitch in order to perform guard band-less recording. Thus, in example 1 where the track pitch is set to 29 μm, guard band-less recording can be permitted by setting the head width Tw2 to about 32 cm and as a result, overwrite recording can be ensured. With the head width increased to such an extent as above, the conventional recording and reproduction of analog audio signals can also be effected. On the assumption that the time for recording an analog video of 30 frames is 2 hours, the recording time in this case is twice the analog recording time, amounting to 4 hours. It will be appreciated that example 1 coincides with the long play recording mode called LP mode during analog video recording. Accordingly, the servo circuit inclusive of the time constant circuit can be realized with substantially the same construction as that for conventional analog signal recording and a reduction in the circuit scale can be envisaged.

In example 2, the tape transportation speed V2 is set to ⅓ of that for the standard play mode during analog video recording, that is, coincides with the speed in the long play recording mode called EP mode (SLP mode in US) and the track pitch Tp2 is set to about 19 μm. In that case, the head width Tw2 can be about 28 μm equal to the conventional head width. The recording time is tripled amounting to 6 hours. In this case, too, the servo circuit inclusive of the time constant circuit can be realized with substantially the same construction as that for conventional analog signal recording and a reduction in circuit scale can be envisaged.

Incidentally, when reproduction of digital signals is considered, cross talk from an adjacent track increases with the head width set to be wider than the track pitch and hence, the narrower the head width, the more the obtained S/N can be improved. But for recording an analog audio signal with the same head, too, the analog audio signal recording format requires that the head width be equal to or greater than 20 μm. Also, when overwrite recording of digital signals is considered, the head width must be at least 3 μm or more wider than the track pitch as described previously. Accordingly, in order to permit the common use of the head for digital signal recording to the head for analog audio signal recording, the track pitch must be equal to or greater than 17 μm and equal to or less than 29 μm and the head width must be equal to or greater than 20 μm and equal to or less than 32 μm.

It has been found that the common use of the head for analog audio signal recording to the head for digital signal recording causes a new phenomenon. More specifically, when a digitally recorded tape is reproduced by the conventional analog VTR, an analog audio signal is reproduced while being mistaken for a digital signal and an abnormal sound is generated. The level of the abnormal sound is so high that the abnormal sound astonishes persons and sometimes breaks the loudspeaker. This abnormal sound can be prevented from being generated by shifting the track pitch of digital signal from that of the conventional analog signal. More particularly, the pull-in range of capstan servo for controlling the tape transportation speed is typically about ±10% for each mode in the conventional reproducing system servo of analog VTR and therefore, capstan servo is not applied to a tape having the track pitch which deviates from this range and the recording track cannot be scanned correctly. As a result, the reproduced output level becomes unstable to operate voice mute, thereby preventing the generation of the abnormal sound. From the above, by setting the track pitch Tp2 of digital signal to 21 μm or more being +10% of 19 μm which is the track pitch in the EP mode and to 26 μm or less being −10% of 29 μm which is the track pitch in the LP mode, the abnormal sound can be prevented from being generated.

Figure 5:
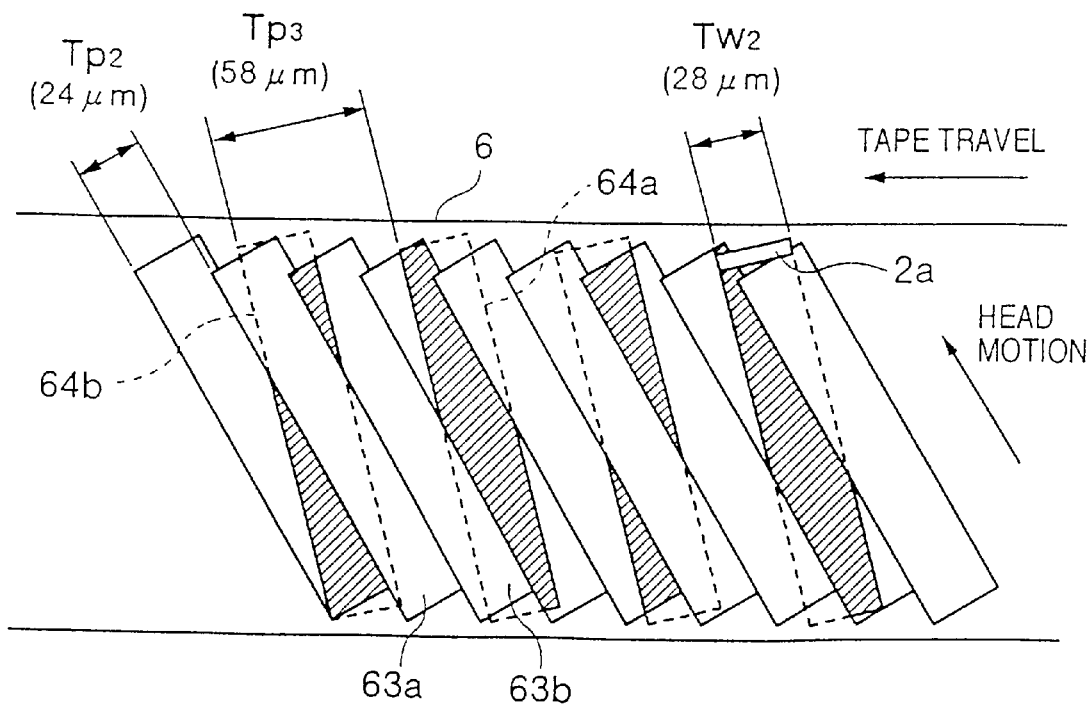
FIG. 5 is a diagram showing a track pattern when a digitally recorded magnetic tape is reproduced with a conventional apparatus.

FIG. 5 is a diagram showing a track pattern during reproduction for explaining the principle of the above. Illustrated at 63a and 63b in solid line in the Figure are digitally recorded tracks having a track pitch Tp2 of, for example, 24 μm. Illustrated at 64a and 64b in dotted line are tracks scanned with the audio heads 2a and 2b (having a head width Tw2 of, for example, 28 μm) when the digitally recorded tape is reproduced with the conventional analog VTR. In this case, since capstan servo is not applied as described previously, the tape travels in the SP mode and the track pitch Tp3 in this mode is 58 μm. When displacement occurs between the recording track and the scanning track in this manner, reproduction can actually be allowed at only portions, hatched in the drawing, where the azimuth angle of the recording track coincides with that of the scanning track, causing the reproduced level to vary. Accordingly, when the reproduced level is unstable as above, the audio mute is operated to interrupt the supply of a demodulation signal to the loudspeaker in most of VTR's. As a result, the generation of the abnormal sound can be prevented.

In examples 3 and 4, the head width is substantially comparable to the conventional head width, amounting to 28 μm and the track pitch Tp2 is so set as to satisfy the condition that guard band-less recording can be allowed, in accordance with the conditions as above. In example 3, the tape transportation speed V2 is lower than that in example 1, amounting to about 13.9 mm/s, the track pitch Tp2 is 24 μm as exemplified in the example of FIG. 5 described hereinbefore, and the recording time is about 4.8 hours. In example 3, the track pitch Tp2 is changed by changing the tape transportation speed V2 but conversely, the track pitch Tp2 can also be changed by changing the drum rotation speed R2 while keeping the tape transportation speed V2 unchanged. In example 4, the drum rotation speed R2 is higher than in example 1, amounting to 37.5 rps, to set the track pitch Tp2 to about 23 μm and the recording time is 4 hours. Obviously, both of the tape transportation speed V2 and the drum rotation speed R2 may be changed.

As described above, according to the present invention, digital video of picture quality comparable to or more excellent than that of the conventional analog video can be recorded for a recording time which is twice or more the conventional recording time. Table 1 shows the four examples but the present invention is in no way limited thereto and in essence, under the condition that the track pitch Tp2 is equal to or greater than 17 μm and is equal to or less than 29 μm, preferably equal to or greater than 21 μm and equal to or less than 26 μm, the recording time which is twice or more that in the analog recording SP mode can be secured and by making the head width Tw2 at least about 3 μm wider than the track pitch Tp2, the guard band-less recording and the overwrite recording can be ensured.

Now, the identification signal generating circuit 42 receives the control signal CR1 from the analog/digital selecting circuit 51 and generates an identification signal for enabling the reproducing side to discriminate the kind of a recorded signal. The identification signal is supplied to the magnetic head 4 through the recording amplifier 44 and recorded at a so-called linear track on the magnetic tape 6 in the longitudinal direction thereof.

An audio track or a control track may be used as the linear track. When the audio track is utilized, an analog audio signal is recorded as usual during analog video signal recording and the identification signal is recorded during digital video signal recording. When the control track is utilized, a control signal is recorded as usual during analog video signal recording but during digital video signal recording the control signal, for example, is modulated in pulse width with the identification signal and recorded. This ensures that the recording amplifier 44 and magnetic head 4 can be used in common to analog video signal recording and digital video signal recording, and new recording amplifier and magnetic head need not be provided additionally to envisage simplification and a reduction in cost of the apparatus.

Next, the mode of reproduction will be described. In this mode, each of the transfer switches 15, 25 and 45 is transferred to a "P" contact. The identification signal detecting circuit 48 receives an output signal reproduced from the magnetic head 4 and amplified by the reproducing amplifier 46 and detects the duration of pulse width of the output signal to detect an identification signal indicating whether the signal recorded on the magnetic tape 6 is an analog video signal or a digital video signal. Then, the circuit 48 delivers the detected identification signal to the analog/digital discriminating circuit 53.

Receiving the identification signal from the identification signal detecting circuit 48, the analog/digital discriminating circuit 53 determines the signal recorded on the magnetic tape 6 as to whether to be an analog video signal or a digital video signal. Then, the analog/digital discriminating circuit 53 delivers a control signal CP1 which controls the transfer switches 17 and 27 such that they are transferred to the processing system for the reproduced signal. The servo circuit 49 also receives the control signal CP1 to control the rotation speed R of rotary drum 5 to either the first rotation speed R1 or the second rotation speed R2 and the transportation speed V of magnetic tape 6 to either the first transportation speed V1 or the second transportation speed V2.

The mode of reproducing an analog video signal will first be described.

As described above, when a signal recorded on the magnetic tape 6 is determined as an analog video signal by means of the analog/digital discriminating circuit 53, a signal SP 1 reproduced from the magnetic heads 1a and 1b and amplified by the reproducing amplifier 16 is fed to the analog video reproduced signal processing circuit 18 through the transfer switch 17 so as to undergo the processing inverse to that of the analog video recording signal processing circuit 12, with the result that an analog video signal of an original base band is delivered out of the output terminal 19. On the other hand, a signal SP 2 reproduced from the magnetic heads 2a and 2b and amplified by the reproducing amplifier 26 is supplied to the analog audio reproduced signal processing circuit 28 through the transfer switch 27, converted into an original analog audio signal and delivered out of the output terminal 29.

Next, the mode of reproducing a digital video signal will be described.

When a signal recorded on the magnetic tape 6 is determined as a digital video signal by means of the analog/digital discriminating circuit 53, a control signal CP1 delivered out of the circuit 53 causes each of the transfer switches 17 and 27 to transfer to a "D" contact and a signal SP3 reproduced from the magnetic tapes 2a and 2b and amplified by the reproducing amplifier 26 is inputted to the digital reproduced signal processing circuit 38 through the transfer switch 27. The digital reproduced signal processing circuit 38 performs the demodulating and de-formatting processing which is inverse to the processing of the digital recording signal processing circuit 32, with the result that an original digital video and audio signal is restored and delivered out of the output terminal 39.

Figure 6:
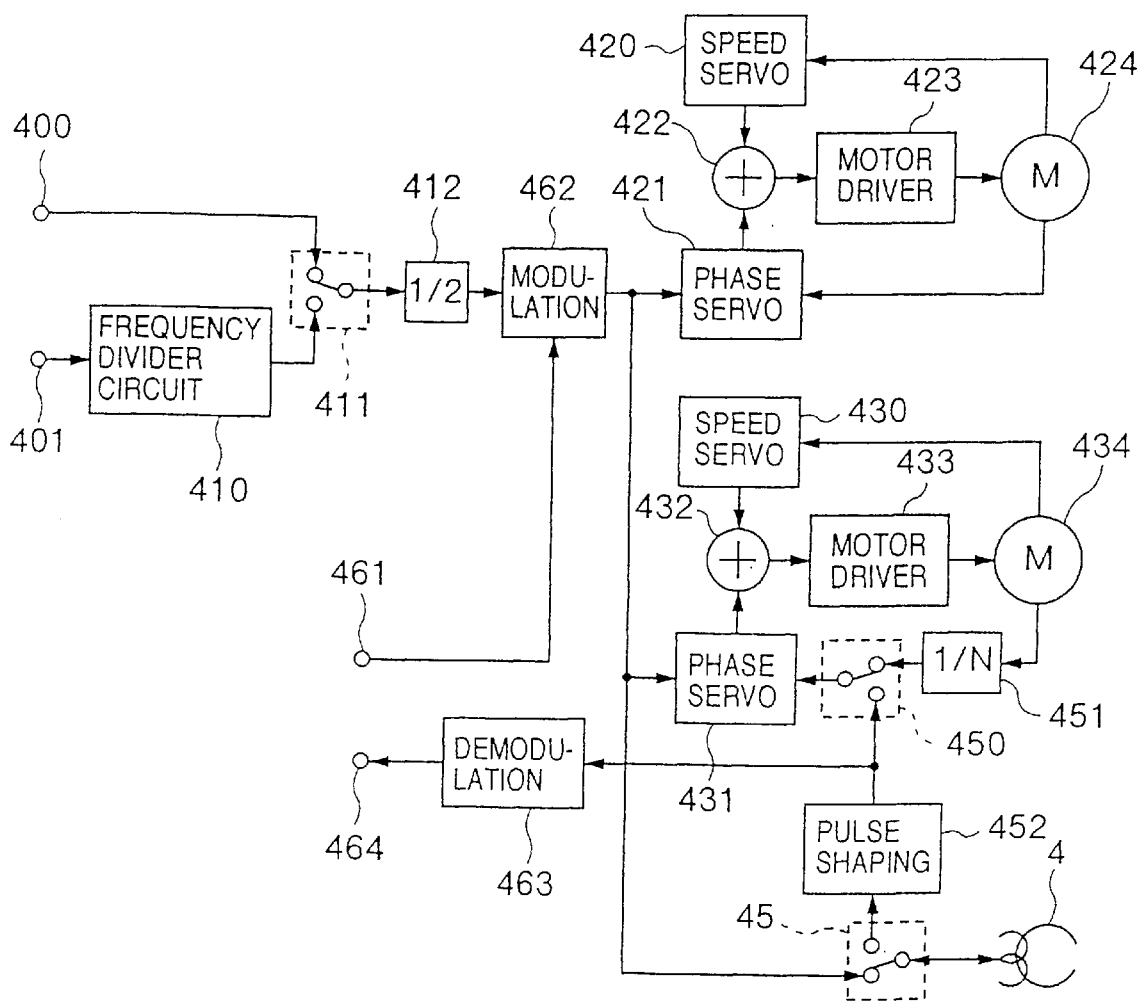
FIG. 6 is a block diagram showing an example of the construction of a servo circuit.

FIG. 6 is a block diagram showing an example of the recording system servo circuit 41 and reproducing system servo circuit 49. The identification signal generating circuit 42, transfer switch 45, magnetic head 4 and identification signal detecting circuit 48 are included in the illustration of FIG. 6. In FIG. 6, reference numeral 400 designates an input terminal for a vertical synchronizing signal used when an analog video signal is recorded, 401 an input terminal for a reference signal, 410 a frequency divider circuit, 411 and 450 switching circuits, 412 a ½ frequency divider circuit, 420 and 430 speed servo circuits, 421 and 431 phase servo circuits, 422 and 432 adder circuits, 423 and 433 motor drivers, 424 and 434 motors, 451 a 1/N frequency divider circuit, 452 a pulse shaping circuit, 461 an input terminal for an identification signal to be recorded, 462 a PWM modulating circuit, 463 a PWM demodulating circuit, and 464 an output terminal for a reproduced identification signal.

The mode of recording an analog signal will first be described.

In the case of recording an analog signal, a vertical synchronizing signal is inputted through the terminal 400. The vertial synchronizing signal is separated in the analog video signal recording processing circuit 12 shown in FIG. 1. The vertical synchronizing signal inputted through the terminal 400 is supplied to the switching circuit 411. In this mode, the switching circuit 411 delivers the vertical synchronizing signal inputted through the terminal 400. The signal delivered out of the switching circuit 411 is subjected to ½ frequency division by means of the ½ frequency divider circuit 412 and fed to the PWM modulating circuit 462. In the PWM modulating circuit 462, the vertical synchronizing signal subject to ½ frequency division is modulated in pulse width with the identification signal from the input terminal 461, and a modulated signal is inputted to the phase servo circuit 421 of drum system and the phase servo circuit 431 of capstan system as well as to the magnetic head 4 through the transfer switch 45 and recorded as a control signal on the magnetic tape.

The drum motor 424 is driven for rotation by the motor driver 423. At that time, a rotation frequency of the drum motor 424 is detected and inputted to the speed servo circuit 420. The speed servo circuit 420 detects the inputted rotation frequency of the drum motor 424 and delivers a difference signal from a predetermined frequency. The difference signal is supplied to the adder circuit 422. On the other hand, the drum motor 424 detects its rotation phase, which is supplied to the phase servo 421. The phase servo 421 compares a signal supplied from the PWM modulating circuit 462 with the phase of the drum motor and delivers a signal representative of a difference there-between to the adder circuit 422. In the adder circuit 422, the inputted difference signals from the speed servo circuit 420 and phase servo circuit 421 are added together, and a resulting signal is fed back to the motor driver 423. In this manner, the rotation of the drum motor 424 is so controlled as to be phase locked with the signal supplied from the PWM modulating circuit 462.

The capstan system operates in substantially the same manner. The capstan motor 434 is rotated by the motor driver 433. A rotation frequency of the capstan motor 434 is detected and supplied to the speed servo circuit 430. The speed servo circuit 430 compares the rotation frequency of the capstan motor 434 with a predetermined frequency and delivers a difference signal which in turn is supplied to the adder circuit 432. On the other hand, the rotation frequency of the capstan motor 434 is supplied to the 1/N frequency divider circuit 451. A frequency divided signal is fed to the switching circuit 450. In this mode, the switching circuit 450 is so transferred as to deliver the signal from the 1/N frequency divider circuit 451. The output signal of the switching circuit 450 is supplied to the phase servo circuit 431. The phase servo circuit 431 compares a phase of the signal from the PWM modulating circuit 462 with that of the input signal from the switching circuit 450 and delivers a difference signal to the adder circuit 432. The adder circuit 432 adds the difference signal from the speed servo circuit 430 and the difference signal from the phase servo circuit 431 to generate a sum signal which is delivered to the motor driver 433. The motor driver 433 controls the capstan motor 434 such that the capstan motor 434 is phase locked with the signal from the PWM modulating circuit 462.

During reproduction, a reference signal is inputted through the terminal 401 and supplied to the frequency divider circuit 410. The frequency divider circuit 410 divides the frequency of the input reference signal to deliver a signal of the same frequency as that of the vertical synchronizing signal during recording. The output signal of the frequency divider circuit 410 is supplied to the switching circuit 411. In this mode, the switching circuit 411 selects and delivers the output signal of the frequency divider circuit 410. The output signal of the switching circuit 411 is supplied to the ½ frequency divider circuit 412 and a resulting ½ frequency-divided signal is supplied to the phase servo circuits 421 and 431 through the PWM modulating circuit 462. At that time, the PWM modulating circuit 462 delivers a signal of a constant pulse width without performing the substantial modulation operation.

The drum system operates in the same way as that for recording and the drum is phase locked with the input signal from the PWM modulating circuit 462.

The capstan system will now be described. During reproduction, the control signal written during recording is reproduced from the magnetic tape 6 by way of the magnetic head 4 and supplied to the transfer switch 45. During reproduction, the transfer switch 45 delivers the reproduced signal from the magnetic head 4 to a pulse shaping circuit 452. In the pulse shaping circuit 452, the waveform of the input signal is shaped by, for example, being passed through a comparator. A shaped signal is fed to the switching circuit 450 and in the reproduction mode, the switching circuit connects the signal from the pulse shaping circuit 452 to the phase servo circuit 431. The phase servo circuit 431 carries out control operation such that the control signal on the magnetic tape is phase locked with the signal from the PWM modulating circuit 462. Through this, the magnetic tape can be scanned with the magnetic head carried on a drum at the same phase for both recording and reproduction operations and the signal on the magnetic tape can be reproduced.

Operation for controlling the drum and capstan carried out when an analog signal is inputted has been described.

Operation of the servo circuit shown in FIG. 6 carried out in the mode of recording a digital signal will now be described.

During recording, a reference signal is inputted through the terminal 401 and supplied to the frequency divider circuit 410. The frequency divider circuit divides the frequency of the input signal to a suitable value and a frequency divided output signal is fed to the switching circuit 411. When used for recording/reproducing the digital signal, the switching circuit 411 selects and delivers the signal of the frequency divider circuit 410. The output signal of the switching circuit 411 is subjected to ½ frequency division by the ½ frequency divider circuit 412 and modulated in pulse width with the identification signal from the input terminal 461 by means of the PWM modulating circuit 462. At that time, by changing the delivered pulse width, in other words, the duty ratio in the case of analog signal recording from that in the case of digital signal recording, discrimination during reproduction can be facilitated. Subsequently, as in the case of recording of an analog signal, the drum and capstan are locked with the output signal of the PWM modulating circuit 462.

By selecting the frequency of the reference signal supplied from the terminal 401 and the frequency division ratio of the frequency divider circuit 410 to suitable values, the frequency of output signal of the ½ frequency divider circuit 412 can be set to a desired drum rotation frequency. By setting the tape transportation speed to a desired value by means of the speed servo circuit 430 and setting the frequency division ratio of the 1/N frequency divider circuit 451 in compliance with the frequency of output signal of the ½ frequency divider circuit 412, the tape can be traveled at a required speed. Further, by making the frequency of output signal of the frequency divider circuit 410 substantially equal to the vertical synchronizing frequency of the video signal, the rotation number of the drum carrying the magnetic tape can be made to be equal to that for recording an analog signal, so that contact between the magnetic head and the magnetic tape can be promoted to keep recording characteristics excellent. By making the frequency division ratio smaller and making the output signal frequency of the frequency division circuit 410 higher, the rotation frequency of the drum can be increased easily to increase the relative speed between the magnetic head and the magnetic tape and accordingly, even a signal at a high recording rate can be recorded.

During reproduction, by selecting the frequency of the reference signal inputted through the terminal 401 and the frequency division ratio of the frequency divider circuit 410 to suitable values, the signal frequency of he frequency divider circuit 410 can be made to be equal to that for recording. Through this, both of the drum system and the capstan system can be operated in the same way as that for reproducing an analog signal and the drum can be phase locked with the output signal of the PWM modulating circuit 462. The control signal reproduced from the magnetic tape can be phase locked with the output signal of the PWM modulating circuit 462. In this manner, the same signal as that for recording can be reproduced.

The output signal of the pulse shaping circuit 452 is also supplied to the PWM demodulating circuit 463 and the duty ratio, for example, of the output signal is used to determine the recorded signal as to whether to be an analog signal or a digital signal. Then, a result of discrimination is delivered out of the output terminal 464 as the identification signal.

Figure 7:
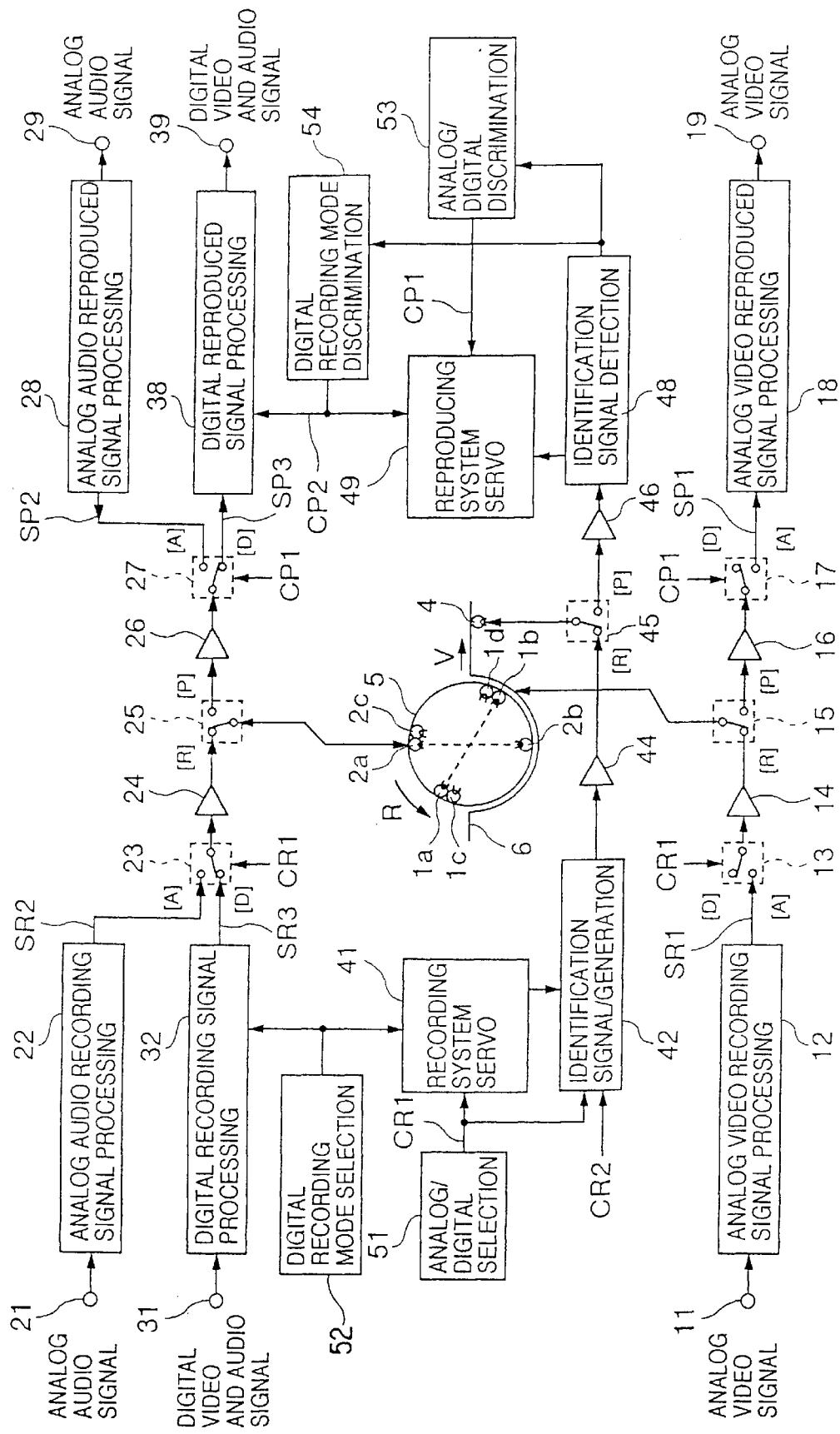
FIG. 7 is a block diagram showing another embodiment of the video signal recording and reproducing apparatus according to the present invention.

FIG. 7 is a block diagram showing another embodiment of the video signal recording and reproducing apparatus according to the present invention. In the Figure, reference numerals 1*c*, 1*d* and 2*c* designate magnetic heads, 52 a digital recording mode selecting circuit and 54 a digital recording mode discriminating circuit, and the other components designated by the same reference numerals as those in FIG. 1 are corresponding components of FIG. 1. The present embodiment features the provision of the long play recording mode for both the analog recording and the digital recording.

The operation of recording an analog video signal in the long play recording mode is the same as that in the conventional apparatus dedicated to analog recording. More particularly, when an analog video signal is selected, by means of the analog/digital selecting circuit 51, as a signal to be recorded, and an analog recording mode selecting circuit (not shown) selects the long play mode, the recording system servo circuit 41 controls the rotation speed R of rotary drum 5 to the first rotation speed R1 which is the same as that in the standard play (SP) mode and the transportation speed V of magnetic tape 6 to ½ (LP mode) or ⅓ (EP mode) of the first transportation speed V1 in the SP mode, so that a track having a track pitch Tp1 which is ½ or ⅓ of that in the SP mode. Then, an analog video recording signal SR1 similar to that shown at (A) in FIG. 2 is supplied to the magnetic heads 1*c* and 1*d* for long play recording and recorded on a surface layer of the track of the magnetic tape. An analog audio recording signal SR2 similar to that shown at (B) in FIG. 2 is recorded on a depth layer of the track of the magnetic tape by means of the magnetic heads 2*a* and 2*b*.

Next, the mode of recording a digital video signal will be described.

The digital recording mode selecting circuit 52 selects one mode out of a plurality of modes in accordance with a transmission bit rate of an inputted digital video and audio signal and delivers an output control signal CR2. As far as the case of the standard play mode in which a digital video and audio signal of the standard transmission bit rate (for example, 7.5 to 15 Mbps as described previously) is recorded is concerned, the operation has already been described in connection with the embodiment of FIG. 1.

On the other hand, in the case of the long play mode in which a digital video and audio signal having a transmission bit rate which is 1/N of the standard transmission bit rate, the recording servo circuit 41 receives the output control signal CR2 from the digital recording mode selecting circuit 52 to control the rotation speed R of rotary drum 5 to the second rotation speed R2 which is the same as that in the standard play mode and the transportation speed V of magnetic tape 6 to a transportation speed (V2/N) which is 1/N of the second transportation speed V2 in the standard play mode. Delivered out of the digital recording signal processing circuit 32, on the other hand, is a recording signal SR3 which is compressed on time domain to 1/N in synchronism with the rotation of the rotary drum 5.

Figure 8:
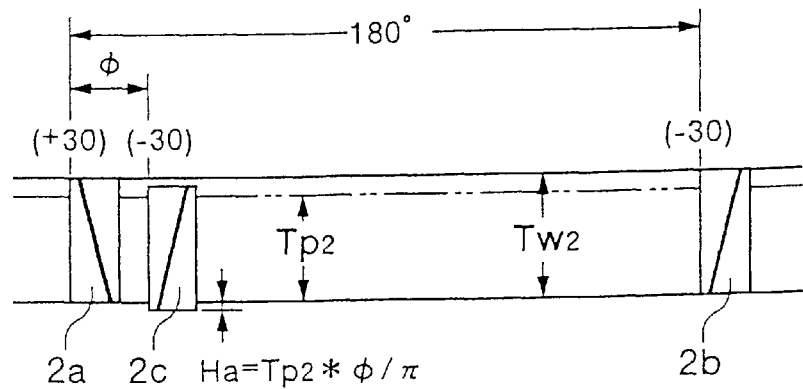
FIG. 8 is a diagram showing an example of fitting height of magnetic heads for digital recording.

FIG. 8 shows an example of fitting height of the magnetic heads 2*a*, 2*b* and 2*c* mounted to the rotary drum 5 in which, for example, the magnetic head 2*c* having the same azimuth angle as the magnetic head 2*b* is mounted closely to the magnetic head 2*a*. A difference Ha in fitting height between the magnetic heads 2*a* and 2*c* is set to a value which complies with an intergap distance φ.

Figure 9:
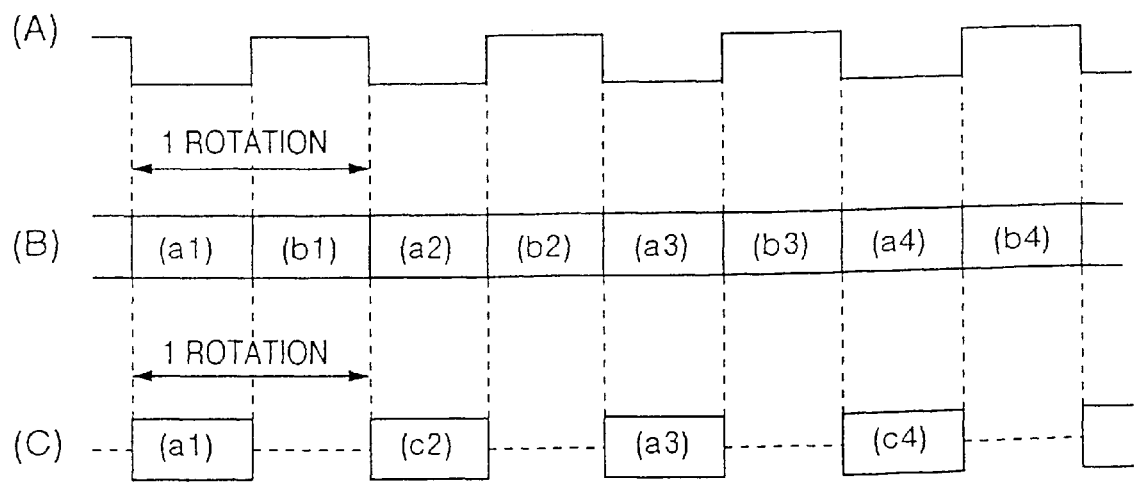
FIG. 9 is a diagram showing an example of timings of the drum rotation and digital recording signal.

FIG. 9 is a waveform diagram showing an example of timings of the rotation of rotary drum 5 and the digital recording signal SR3. Illustrated at (A), (B) and (C) in FIG. 9 are the timing of the rotary drum 5 and the timings of digital recording signal SR3 in the standard play mode and the long play mode, respectively. At (A), during a period of low level, recording is effected by the magnetic head 2*a* or 2*c* and during a period of high level, recording is effected by the magnetic head 2*b*. As shown, in the case of the standard play mode, a continuous recording signal SR3 is recorded and in the case of the long play mode, a recording signal SR3 which is compressed on time domain to 1/N in synchronism with the rotation of the rotary drum 5 is recorded. In that case, since the transportation speed V of the magnetic tape 6 is controlled to 1/N of that in the standard play mode, the recording pattern is the same as that in FIG. 4 and consequently, tracks 63*a* and 63*b* having substantially the same track pitch Tp2 as that in the standard play mode are formed.

As will be seen from the above, when a digital video and audio signal having a lower transmission bit rate in relation to a reference of a digital video and audio signal of the standard transmission bit rate is recorded, the compression ratio on time domain is changed in accordance with the transmission bit rate ratio N to make the recording bit rate constant regardless of the transmission bit rate and because of the rotation speed R of the rotation drum 5 being constant, the recording density can be constant. Accordingly, the N multiplied long play can be realized while keeping the recording density constant. In the example shown at (C) in FIG. 9, the compression ratio on time domain N is exemplified as 2 but it can be any integer. Specifically, when N is even, a signal compressed on time domain can be recorded using the magnetic heads 2*a* and 2*c* as in the illustrated instance and when N is odd, it can be recorded using the magnetic heads 2*a* and 2*b*. Through this, the common use of track format recorded on the magnetic tape 6 to various modes inclusive of the standard play mode indicated by N=1 can be ensured.

Figure 10:
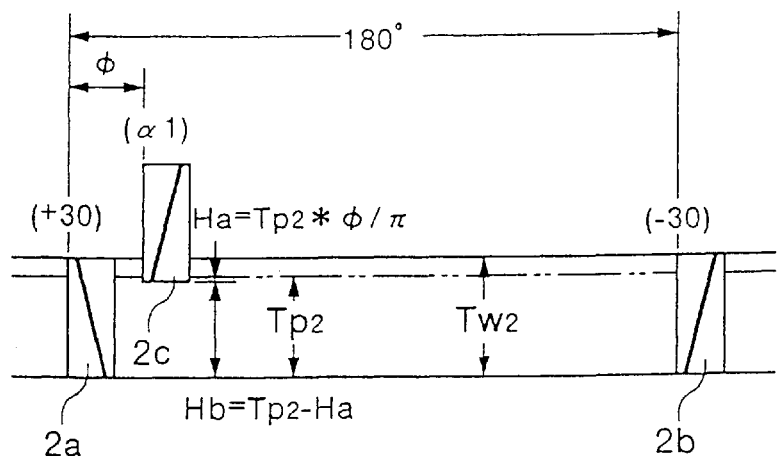
FIG. 10 is a diagram showing another example of fitting height of magnetic heads for digital recording.

FIG. 10 shows another example of fitting height of the magnetic heads 2*a*, 2*b* and 2*c* mounted to the rotary drum 5 in which the magnetic head 2*c* has an azimuth angle α1 which is different from that of the magnetic heads 2*a* and 2*b* and it is mounted closely to the magnetic head 2*a* at a fitting height of Hb. The azimuth angle α1 of the magnetic head 2*c* has a suitable value which is 0° or in inverting polarity (−) in relation to +30° azimuth angle of the magnetic head 2*a* closely mounted and is set to, for example, −6°. The azimuth angle α1 may be −30° as in the case of the embodiment of FIG. 8 but in consideration of the problem of extensibility to the HD mode to be described later, it may be 0° most preferably to meet the extensibility to the HD mode. A difference $H_b$ of the fitting height between the magnetic heads 2*a* and 2*c* is set to a value as shown which is a difference of subtraction of a height Ha complying with the inter-gap distance φ from the track pitch Tp2.

Figure 11:
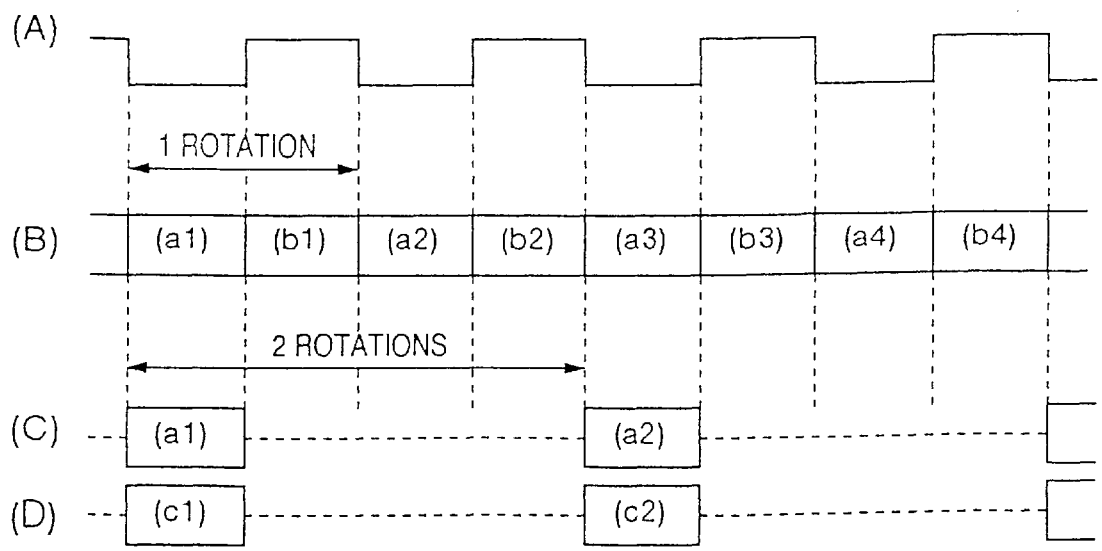
FIG. 11 is a diagram showing another example of timings of the drum rotation and digital recording signal.

FIG. 11 is a waveform diagram showing another example of timings of the rotation of rotary drum 5 and the digital recording signal SR3, the timings corresponding to the head arrangement of FIG. 10. As in FIG. 9, there are illustrated the timing of the rotary drum 5 at (A), the timing of digital recording signal SR3 in the standard play mode at (B) and the timing of digital recording signal SR3 in the long play mode at (C), (D). At (A), during a period of low level, recording is effected by the magnetic head 2*a* or 2*c* and during a period of high level, recording is effected by the magnetic head 2*b*. As shown, in the case of the standard play mode, a continuous recording signal SR3 is recorded and in the case of the long play mode, a recording signal SR3 which is compressed on time domain to 1/N in synchronism with the rotation of the rotary drum 5 is recorded. The recording pattern in this case is similar to that of FIG. 4.

Next, the operation during reproduction will be described.

The identification signal detecting circuit 48 receives a signal reproduced from the magnetic head 4 and amplified by the reproducing amplifier 46 and detects an identification signal indicating whether a signal recorded on the magnetic tape 6 is an analog video signal or a digital video signal. Then, the circuit 48 delivers the detected identification signal to the analog/digital discriminating circuit 53 and the digital recording mode discriminating circuit 54.

Receiving the identification signal from the identification signal detecting circuit 48, the analog/digital discriminating circuit 53 determines the signal recorded on the magnetic tape 6 as to whether to be an analog video signal or a digital video signal, thus producing a control signal CP1 which controls the transfer switches 17 and 27 such that the processing system for the reproduced signal is switched in.

In the mode of reproducing an analog video signal, the apparatus operates in a similar manner to the conventional apparatus dedicated to analog recording. More particularly, when a signal recorded on the magnetic tape 6 is determined as an analog video signal by means of the analog/digital discriminating circuit 53 and is determined to be of the long play mode by means of the analog recording mode discriminating circuit (not shown), the reproducing system servo circuit 49 controls the rotation speed R of rotary drum 5 and the transportation speed V of magnetic tape 6 to the same speeds as those during recording. Then, an analog video signal recorded on a surface layer is reproduced by the magnetic heads 1c and id and an analog audio signal recorded on a depth layer is reproduced by the magnetic heads 2a and 2b.

The mode of reproducing a digital video signal will now be described.

A signal recorded on the magnetic tape 6 is determined, by means of the analog/digital discriminating circuit 53, as a digital video signal and is determined to be of the long play mode by means of the digital recording mode discriminating circuit 54, the reproducing system servo circuit 49 in receipt of output control signals CP1 and CP2 controls the rotation speed R of rotary drum 5 and the transportation speed V of magnetic tape 6 to the same speeds as those during recording. More specifically, the rotation speed R of rotary drum 5 is controlled to the same second rotation speed R2 as that in the standard play mode and the transportation speed V of magnetic tape 6 is controlled to 1/N of the second transportation speed V2 in the standard play mode so as to comply with the recording mode. Then, the recorded digital signal is reproduced by the same magnetic heads 2a and 2b or magnetic heads 2a and 2c as those used during recording.

As described above, according to the present embodiment, by adding only one magnetic head, recording and reproduction in a plurality of long play modes which accord with the ratio of transmission bit rate can be realized.

Figure 12:
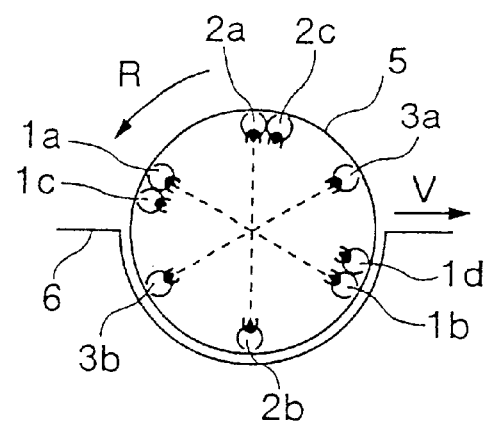
FIG. 12 is a diagram showing a head configuration illustrative of still another embodiment of the video signal recording and reproducing apparatus according to the present invention.
Figure 13:
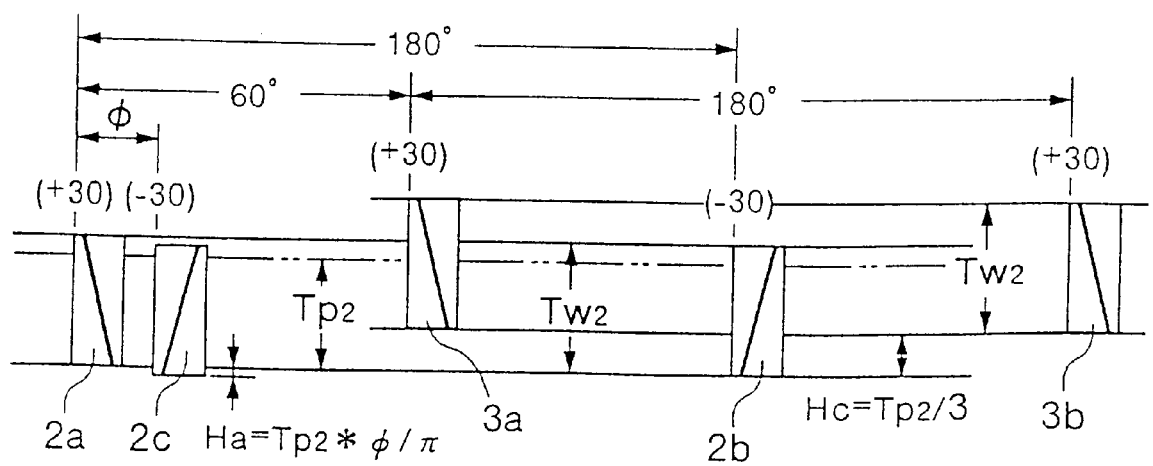
FIG. 13 is a diagram showing still another example of fitting height of magnetic heads for digital recording.

FIGS. 12 and 13 are diagrams showing the head configuration and the head fitting height, respectively, in still another embodiment of the video signal recording and reproducing apparatus according to the present invention. In the Figure, reference numerals 3a and 3b designate magnetic heads which 60° succeeds the magnetic heads 2a and 2b, respectively, and are mounted at a height Hc complying with their inter-gap distance. Other components designated by the same reference numerals as those in FIGS. 7 and 8 are corresponding components inclusive of the circuit construction in FIGS. 7 and 8. The present embodiment features in that a mode (hereinafter referred to as HD mode) of recording a digital video and audio signal having a transmission bit rate which is twice (for example, 15 Mbps to 30 Mbps) the standard transmission bit rate is provided in addition to the long play recording mode. In the standard play mode and long play mode, the operation is carried out in the same way as described in connection with the embodiments of FIGS. 1 and 7. The operation in the HD mode will be described below.

When the HD mode is selected by means of the digital recording mode selecting circuit 52, the recording system servo circuit 41 receives a control signal CR2 delivered out of the circuit 41 and controls the rotation speed R of rotary drum 5 to the same second rotation speed R2 as that in the standard play mode and the transportation speed V of magnetic tape 6 to a value which is twice the second transportation speed V2 in the standard play mode. On the other hand, the digital recording signal processing circuit 32 delivers recording signals SR3 of two channels.

Figure 14:
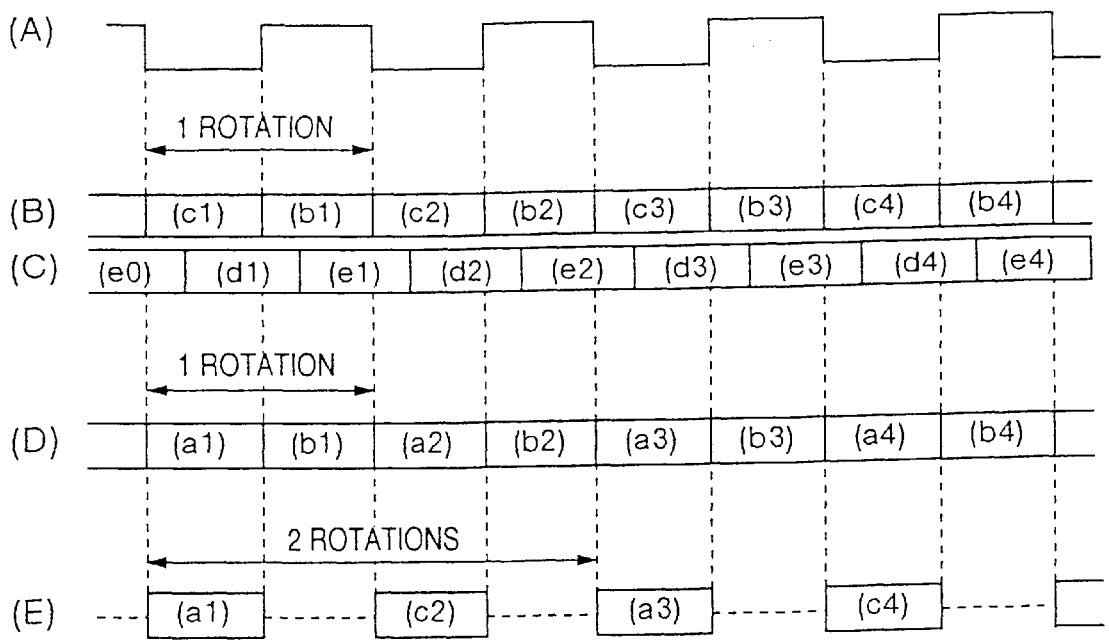
FIG. 14 is a diagram showing still another example of timings of the drum rotation and digital recording signal.

FIG. 14 is a waveform diagram showing an example of timings of the rotation of rotary drum 5 and the digital recording signal SR3. Illustrated at (A), (B) and (C) in FIG. 14 are the timing of the rotary drum 5 and the timings of the digital recording signals SR3 in the HD mode, respectively. For convenience of explanation, timings of the digital recording signal SR3 in the standard play mode and the long play mode are also illustrated at (D) and (E). As shown, in the case of the HD mode, the recording signals SR3 of two channels which are dephased from each other by a difference between fitting angles are delivered, whereby the recording signal at (B) is recorded by the magnetic heads 2c and 2b and the recording signal at (C) is recorded by the magnetic heads 3a and 3b.

Figure 15:
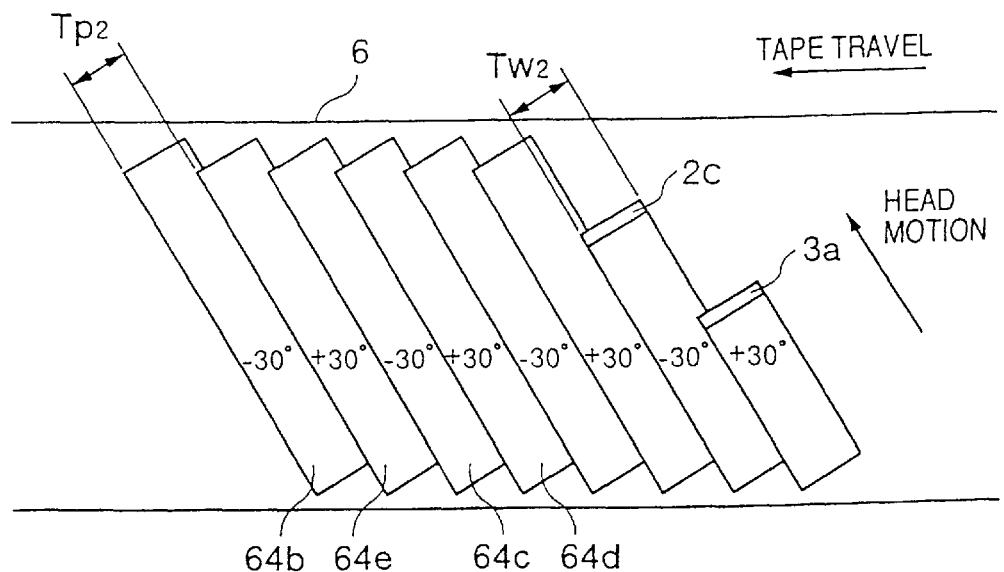
FIG. 15 is a diagram showing another example of the track pattern during digital signal recording.

FIG. 15 is a diagram showing a recording pattern at that time. Since as described above the transportation speed V of the magnetic tape 6 is controlled to a value which is twice the transportation speed in the standard play mode, the track pitch of tracks 64b, 64c, 64d and 64e recorded by the individual magnetic heads coincides with the track pitch in the standard play mode which is Tp2.

As will seen from the above, according to the present embodiment, recording and reproduction of constant recording density can be realized using the track format common to not only the standard play mode and long play mode but also the digital video and audio signal having an information amount which is twice the standard transmission bit rate, for example, a HDTV subject to high-efficient coding.

Figure 16:
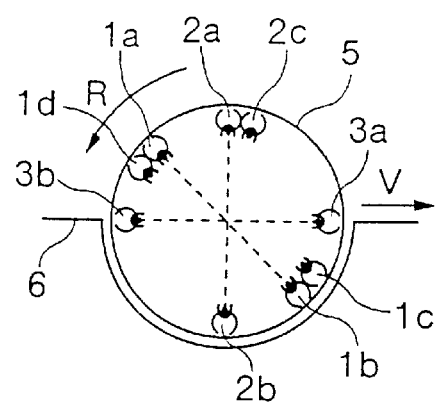
FIG. 16 is diagram showing a head configuration illustrative of still another embodiment of the video signal recording and reproducing apparatus according to the present invention.
Figure 17:
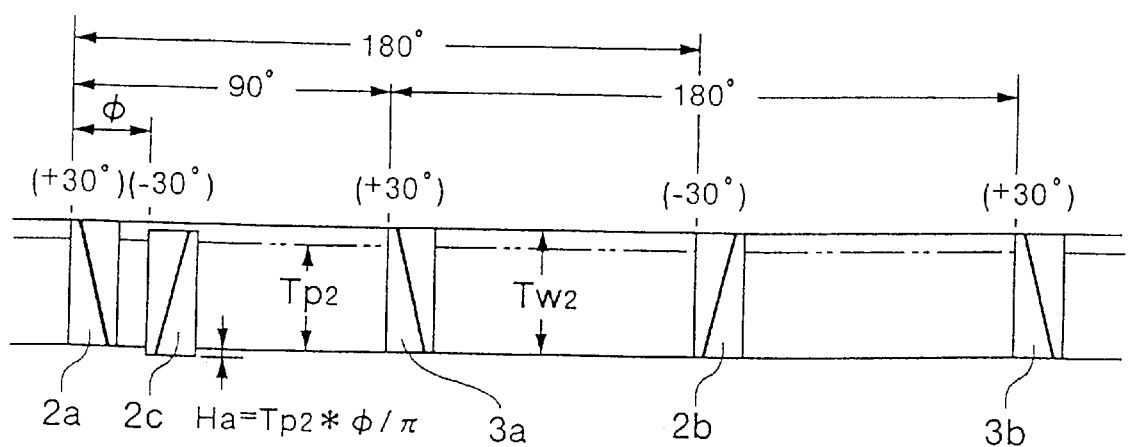
FIG. 17 is a diagram showing still another example of fitting height of magnetic heads for digital recording.

FIGS. 16 and 17 are diagrams showing the head configuration and the head fitting height in still another embodiment of the video signal recording and reproducing apparatus according to the present invention. The present embodiment differs from the embodiment of FIGS. 12 and 13 in that the magnetic heads 3a and 3b are mounted at positions which 90° succeed the magnetic heads 2a and 2b, respectively, thereby bringing about an effect that the magnetic heads 3a and 3b and the magnetic heads 2a and 2b can be at the same height and their fitting can be simplified.

Figure 18:
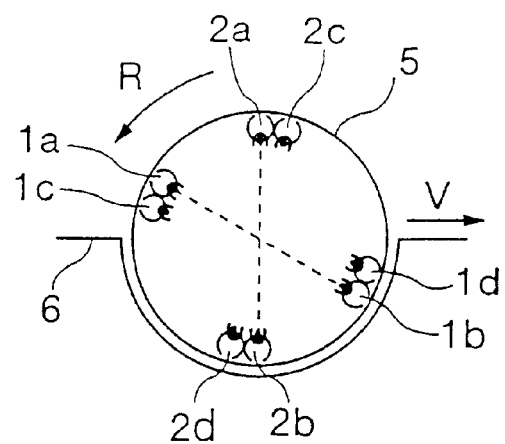
FIG. 18 is a diagram showing a head configuration illustrative of still another embodiment of the video signal recording and reproducing apparatus according to the present invention.
Figure 19:
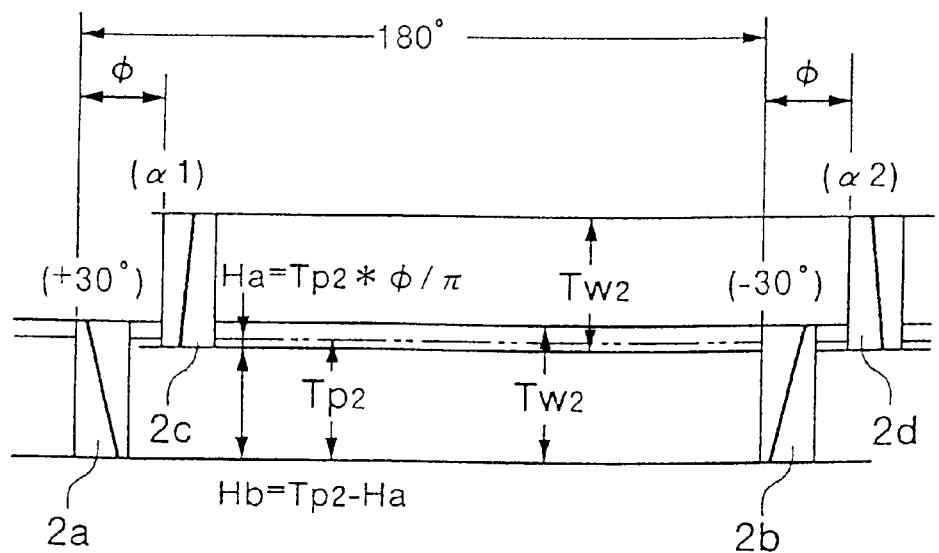
FIG. 19 is a diagram showing still another example of fitting height of magnetic heads for digital recording.

FIGS. 18 and 19 are diagrams showing the head configuration and the head fitting height in still another embodiment of the video signal recording and reproducing apparatus according to the present invention. In the Figure, reference numeral 2d designates a magnetic head having an azimuth angle α2 and mounted closely to the magnetic head 2b. The magnetic heads 2b and 2d are at the same fitting heights as those of the magnetic heads 2a and 2c shown in FIG. 10 and the fitting height Hb is set to a value which is a difference of subtraction of height Ha complying with the inter-gap distance φ from the track pitch Tp2.

Figure 20:
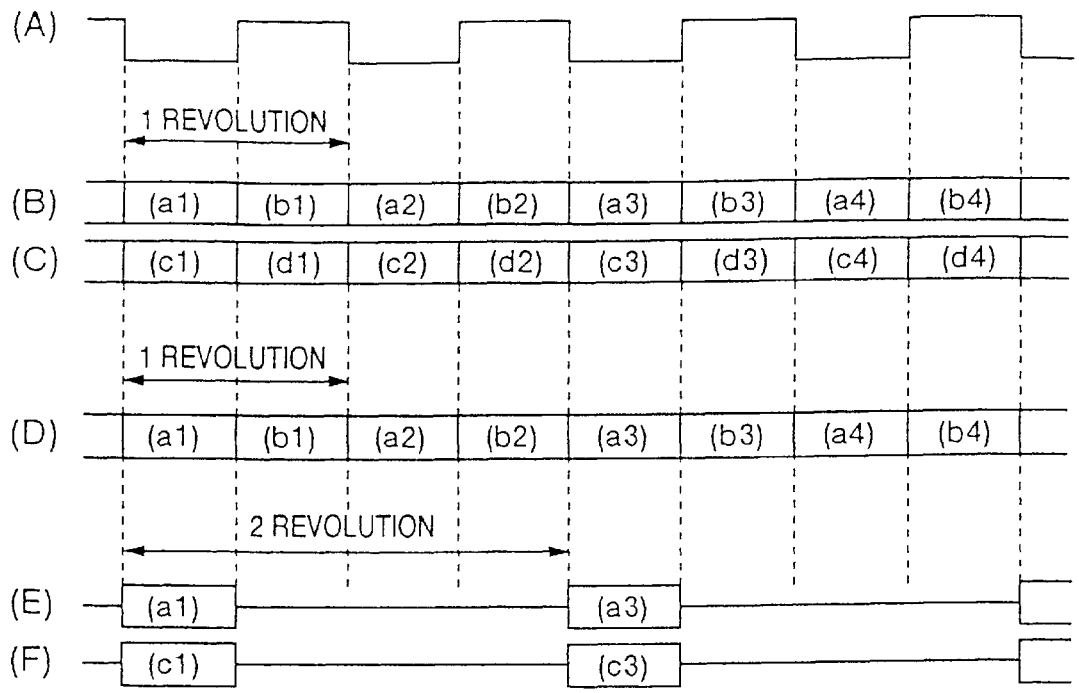
FIG. 20 is a diagram showing still another example of timings of the drum rotation and digital recording signal.
Figure 21:
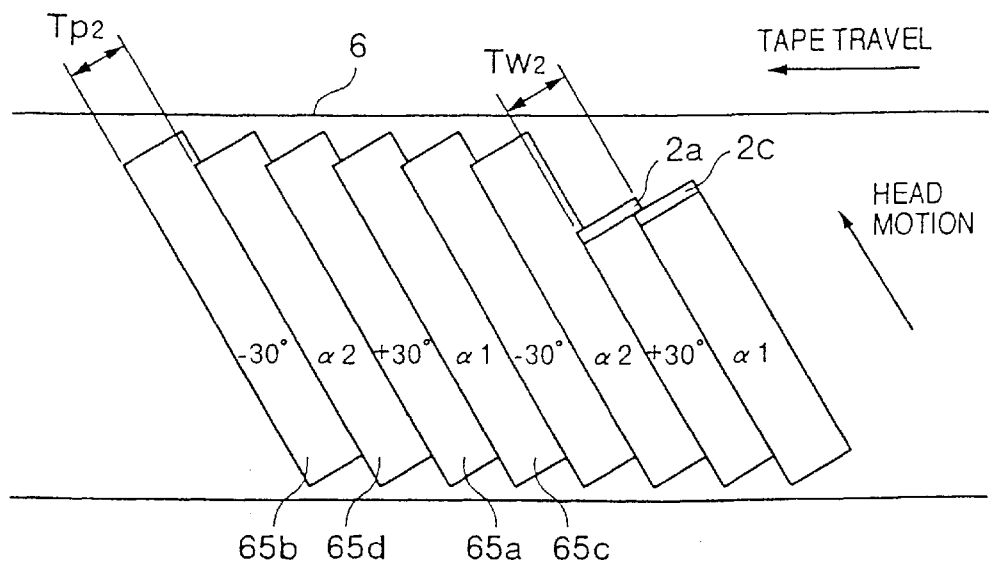
FIG. 21 is a diagram showing still another example of the track pattern during digital signal recording.

The present embodiment is an example where the FIG. 10 head configuration is extended in compliance with the HD mode. In that case, timings of the rotation of rotary drum 5 and the digital recording signal SR3 are shown in FIG. 20 and a recording pattern is shown in FIG. 21. As shown, recording signals SR3 of two systems are delivered at substantially the same timing, whereby a recording signal at (B) is recorded by the magnetic heads 2a and 2b and a recording signal at (C) is recorded by the magnetic heads 2c and 2d.

When azimuth angles α1 and α2 of the magnetic heads 2c and 2d are considered, it will be seen from a recording pattern shown in FIG. 21 that the azimuth angles of tracks 65a, 65c, 65b and 65d repeat themselves in order of +30°, α1, −30° and α2. With α1 selected to −30°, the adjacent tracks 65c and 65b have the same azimuth and guard band-less recording cannot be allowed. This accounts for the fact that setting of α1 to −30° is problematic as described previously in connection with the embodiment of FIG. 10. With α1 selected to −6° and α2 selected to +6°, the difference in azimuth between the adjacent tracks takes 36° and 24°. In this case, the azimuth difference becomes unbalanced but guard band-less recording can be allowed more or less and by virtue of the use of ±6° azimuth, the common use to the analog video recording head can be conceivable. But, needless to say, the azimuth difference between the adjacent tracks can be maximized in balanced fashion when α1 and α2 are both set to 0°. This accounts for the description given in connection with the FIG. 10 embodiment to the effect that most preferably, al may be set to 0°.

Thus, the present embodiment can advantageously meet all modes covering the long play mode and the HD mode by merely adding two of the magnetic heads.

As described above, according to the present invention, a video signal subject to digital compression coding can be recorded on and reproduced from a common recording medium while maintaining the exchangeability with the current analog VTR. In addition, since the head configuration can remain unchanged so as to be realized with the conventional configuration, an expense incurred for addition of the digital recording function can be suppressed to a minimum.

Further, by setting the track pitch during digital video signal recording to 21 μm or more and 26 μm or less, the generation of an abnormal sound can be prevented even when a digitally recorded cassette tape is reproduced with the conventional analog VTR.

Furthermore, long play recording can be permitted by merely adding the single head and all modes of recording and reproduction covering long play recording and high-speed recording of doubled bit rate can be realized by adding two or three heads.

What is claimed is:

1. An apparatus for selectively recording and/or reproducing an analog video signal and a digital information signal including a bit compressed video signal, comprising:
   a plurality of magnetic heads mounted on a rotary drum;
   a first circuit for recording and/or reproducing said analog video signal on/from a magnetic tape by using a part of said plurality of magnetic heads having azimuth angles of ±6 degrees;
   a second circuit for recording and/or reproducing said digital information signal on/from said magnetic tape by using a part of said plurality of magnetic heads having azimuth angles of ±30 degrees; and
   a servo circuit for controlling a rotation speed of said rotary drum and transportation speed of said magnetic tape, so that:
      said rotation speed is approximately 30 rps being phase locked with a vertical synchronizing signal of said analog video signal and a track pitch is approximately 58 μm while recording and/or reproducing said analog video signal; and
      said rotation speed is approximately 30 rps being phase locked with a reference signal different from said vertical synchronizing signal and said track pitch is approximately 29 μm while recording and/or reproducing said digital information signal.

2. An apparatus according to claim 1, further comprising a third circuit for recording and/or reproducing an analog audio signal on/from said magnetic tape by using a part of said plurality of magnetic heads having azimuth angles of ±30 degrees while recording and/or reproducing said analog video signal.

3. An apparatus for selectively recording and/or reproducing an analog video signal and a digital information signal including a bit compressed video signal, comprising:
   a plurality of magnetic heads mounted on a rotary drum;
   a first circuit for recording and/or reproducing said analog video signal on/from a magnetic tape by using a part of said plurality of magnetic heads having azimuth angles of ±6 degrees;
   a second circuit for recording and/or reproducing said digital information signal on/from said magnetic tape by using a part of said plurality of magnetic heads having azimuth angles of ±30 degrees; and
   a servo circuit for controlling a rotation speed of said rotary drum and transportation speed of said magnetic tape, wherein:
      said apparatus has a plurality of analog recording modes for said analog video signal and a digital recording mode for said digital information signal; and
      said servo circuit controls said rotation speed and said transportation speed so that a track pitch in one of said plurality of analog recording modes is approximately 58 μm, a track pitch in another one of said plurality of analog recording modes is approximately 19 μm, and a track pitch in said digital recording mode is approximately 29 μm.

4. An apparatus according to claim 3, wherein said servo circuit rotates said rotary drum at approximately 30 rps both in said plurality of analog recording modes and in said digital recording mode.

5. An apparatus according to claim 3, further comprising a third circuit for recording and/or reproducing an analog audio signal on/from said magnetic tape by using a part of said plurality of magnetic heads having azimuth angles of ±30 degrees in said plurality of analog recording modes.

6. An apparatus for selectively recording and/or reproducing an analog video signal and a digital information signal including a bit compressed video signal, comprising:
   a plurality of magnetic heads mounted on a rotary drum;
   a first circuit for recording and/or reproducing said analog video signal on/from a magnetic tape by using a part of said plurality of magnetic heads having azimuth angles of ±6 degrees;
   a second circuit for recording and/or reproducing said digital information signal on/from said magnetic tape by using a part of said plurality of magnetic heads having azimuth angles of ±30 degrees; and a servo circuit for controlling a rotation speed of said rotary drum and transportation speed of said magnetic tape, wherein:

said apparatus has both a plurality of analog recording modes for said analog video signal and a plurality of digital recording modes for said digital information signal; and said servo circuit controls said rotation speed and said transportation speed so that a track pitches in said plurality of analog recording modes are different from each other, and track pitches in said plurality of digital recording modes are substantially same.

7. An apparatus according to claim 6, wherein said track pitch in a first analog recording mode is approximately 58 $\mu$m, said track pitch in a second analog recording mode is approximately 19 $\mu$m, and said track pitches in said plurality of digital recording modes are approximately 29 $\mu$m.

8. An apparatus according to claim 6, wherein said servo circuit rotates said rotary drum at approximately 30 rps both in said plurality of analog recording modes and in said plurality of digital recording modes.

9. An apparatus according to claim 6, further comprising a third circuit for recording and/or reproducing an analog audio signal on/from said magnetic tape by using a part of said plurality of magnetic heads having azimuth angles of ±30 degrees in said plurality of analog recording modes.

* * * * *